(12) United States Patent
Hecht

(10) Patent No.: US 8,550,754 B2
(45) Date of Patent: Oct. 8, 2013

(54) FULLY INDEXABLE SINGLE-SIDED CUTTING INSERT AND MILLING TOOL

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 254 days.

(21) Appl. No.: 13/149,384

(22) Filed: May 31, 2011

(65) Prior Publication Data

US 2011/0299946 A1 Dec. 8, 2011

(30) Foreign Application Priority Data

Jun. 7, 2010 (IL) .......................................... 206272

(51) Int. Cl.
*B23C 5/20* (2006.01)

(52) U.S. Cl.
USPC ............................. 407/42; 407/113

(58) Field of Classification Search
CPC .................................. B23B 27/16; B23C 5/20
USPC ........... 407/42, 113–116, 66, 67, 103, 33, 61, 407/62, 48
See application file for complete search history.

(56) References Cited

U.S. PATENT DOCUMENTS

| 7,357,604 | B2 | 4/2008 | Craig | |
| 2007/0071561 | A1* | 3/2007 | Agic | 407/34 |
| 2007/0292219 | A1 | 12/2007 | Craig | |
| 2008/0003067 | A1 | 1/2008 | Ejderklint et al. | |
| 2008/0044241 | A1* | 2/2008 | Koskinen | 407/103 |
| 2009/0155004 | A1* | 6/2009 | Jansson | 407/40 |
| 2009/0155005 | A1* | 6/2009 | Jansson | 407/114 |
| 2011/0020080 | A1* | 1/2011 | Zettler | 407/113 |

FOREIGN PATENT DOCUMENTS

| EP | 0287904 | 10/1988 | |
| EP | 0365505 | 4/1990 | |
| JP | 2005-186271 A | * 7/2005 | ............... B23C 5/20 |
| WO | WO 2007/037736 | 4/2007 | |
| WO | WO 2009/075633 | 6/2009 | |
| WO | WO 2009/075634 | 6/2009 | |

OTHER PUBLICATIONS

International Search Report dated Jul. 10, 2011 issued in counterpart PCT application (No. PCT/IL2011/000393).

* cited by examiner

*Primary Examiner* — Daniel Howell
*Assistant Examiner* — Ryan Rufo
(74) *Attorney, Agent, or Firm* — Womble Carlyle

(57) ABSTRACT

A single-sided tangential cutting insert has a peripheral side surface with N identical major sides. The cutting insert has 360°/N rotational symmetry about an insert axis passing through top and bottom surfaces of the insert, where N is an integer greater than 2 and each major side is located between and merges with an adjacent major side. A cutting edge is formed at the intersection of a relief surface and a rake surface. The rake surface is located in the peripheral side surface and extends in an inward direction of the cutting insert from its associated cutting edge to a side surface of the associated major side. At least a portion of the relief surface is located in the top surface.

14 Claims, 4 Drawing Sheets

FULLY INDEXABLE SINGLE-SIDED CUTTING INSERT AND MILLING TOOL

FIELD OF THE INVENTION

The present invention relates to cutting inserts and milling tools for metal cutting operations.

BACKGROUND OF THE INVENTION

Such milling tools include, for example end mills and face mills having cutting inserts with major and adjacent auxiliary cutting edges in which the major cutting edge is adapted to mill a shoulder in a workpiece and at least a section of the adjacent auxiliary cutting edge acts as a wiper to provide a good surface finish. Tangential cutting inserts are mounted so that the cutting forces on the cutting insert are directed along a major (thicker) dimension of the cutting insert. Tangential cutting inserts can withstand greater cutting forces than radially mounted cutting inserts which are oriented in such a manner that the cutting forces are directed along a minor (thinner) dimension of the cutting insert. Of particular interest are tangential indexable cutting inserts with major cutting edges having positive axial rake when mounted in a cutting tool and having as many as possible major cutting edges for a given direction of rotation of the cutting tool. U.S. Pat. No. 7,357,604 discloses an indexable cutting insert with positive axial rake and eight cutting edges. However, the method of manufacturing such a cutting insert is complex due to the presence of undercuts which makes known in the art straightforward pressing and sintering methods impossible to apply.

SUMMARY OF THE INVENTION

In accordance with the present invention there is provided a single-sided cutting insert comprising a top surface, an opposing bottom surface that is different from the top surface, and a peripheral side surface extending between the top and bottom surfaces. The peripheral side surface has N identical major sides, where N is an integer greater than 2 and each major side is located between, and merges with, an adjacent major side.

A cutting edge is associated with each major side. The cutting edge is formed at the intersection of a relief surface and a rake surface. The rake surface is located in the peripheral side surface in an associated major side and extends in an inward direction of the cutting insert from its associated cutting edge to a side surface of the associated major side. At least a portion of the relief surface is located in the top surface.

The cutting edge comprises a major cutting edge formed at the intersection of each major side and the top surface, an auxiliary cutting edge, and a corner cutting edge extending between the major and auxiliary cutting edge. At least a section of the auxiliary cutting edge adjacent the corner cutting edge extends from the corner cutting edge in a direction towards a plane passing through the bottom surface.

The cutting insert is single-sided. That is, the cutting insert is not reversible and so the bottom surface is not interchangeable with the top surface. The bottom surface functions as a seating surface when the cutting insert is mounted in an insert pocket of a milling tool.

The cutting insert is a fully indexable tangential cutting insert having three or more adjacent identical major sides, "fully-indexable" referring to the fact that each major side is located between, and merges with, an adjacent major side, and each major side has an associated major cutting edge on the same side of the cutting insert. The cutting insert may be manufactured by straightforward pressing and sintering. Such cutting inserts are generally considered to be "pressed and sintered cutting inserts."

The rake surface comprises major and auxiliary rake surfaces with a corner rake surface extending therebetween and the relief surface comprises major and auxiliary relief surfaces with a corner relief surface extending therebetween.

The corner, major and auxiliary cutting edges are formed at the intersection of respective corner, major and auxiliary relief surfaces with respective corner, major and auxiliary rake surfaces.

The cutting insert has $\theta°$ rotational symmetry about an insert axis passing through the top and bottom surfaces, where $\theta = 360°/N$.

In accordance with the present invention there is also provided a milling tool comprising a tool body having at least one insert pocket in which a cutting insert according to embodiments of the invention is retained. The at least one insert pocket comprises adjacent side and rear walls generally transverse to a base. The rear wall is provided with two spaced apart protruding tangential location surfaces that abut a given side surface of the cutting insert at two corresponding spaced apart tangential abutment regions. The side wall is provided with an axial location surface that abuts a side surface adjacent the given side surface at an associated axial abutment region.

DETAILED DESCRIPTION OF THE INVENTION

Figure 1:
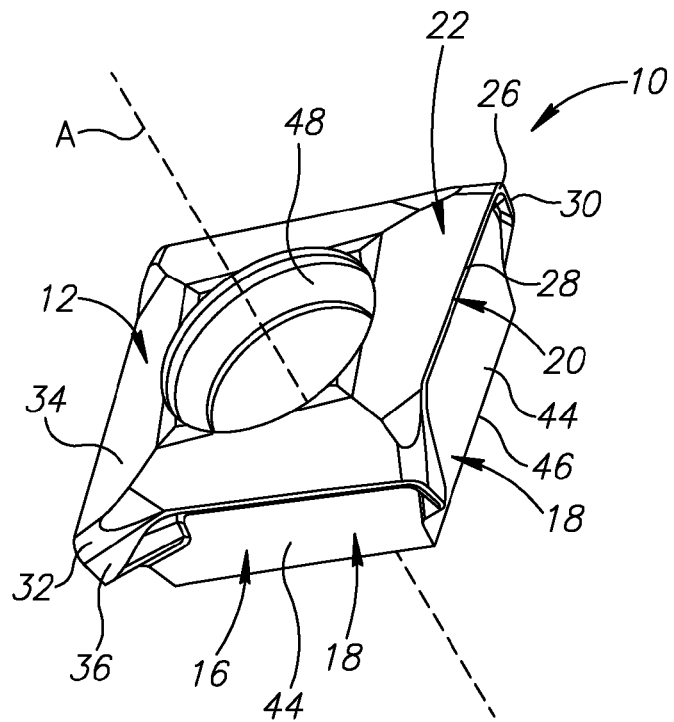
FIG. 1 is a top perspective view of a cutting insert in accordance with a first embodiment of the present invention.
Figure 2:
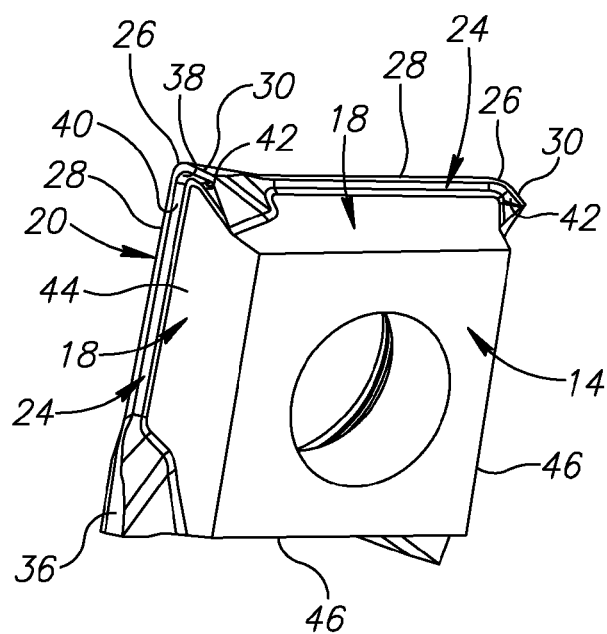
FIG. 2 is a bottom perspective view of the cutting insert shown in FIG. 1.
Figure 3:
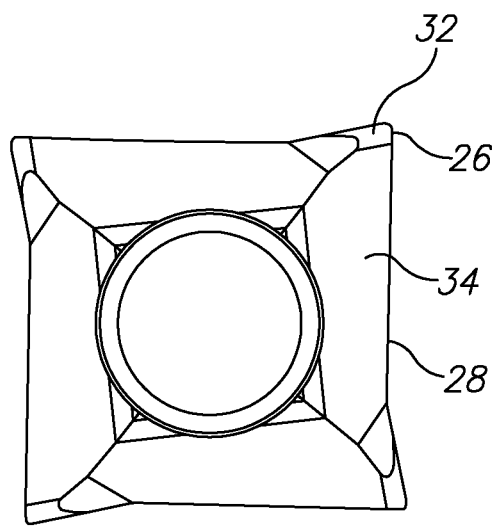
FIG. 3 is a top view of the cutting insert shown in FIG. 1.

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Reference is first drawn to FIGS. 1 to 5, showing a cutting insert 10 in accordance with a first embodiment of the present invention. The cutting insert 10 is indexable and may be made of an extremely hard and wear-resistant material such as cemented carbide, by form-pressing and sintering carbide powders in a binder. Such cutting inserts are generally referred to as "pressed and sintered cutting inserts."

The cutting insert 10 has a top surface 12, an opposing bottom surface 14 and a peripheral side surface 16 extending between the top and bottom surfaces 12, 14. The peripheral side surface 16 has four identical major sides 18; each major side 18 is located between and merges with an adjacent major side 18. The cutting insert 10 has 90° rotational symmetry about an insert axis A passing through the top and bottom surfaces 12, 14.

In the example shown in the figures, the cutting insert 10 has four major sides 18. However, the present invention is by no means restricted to cutting inserts having four major sides 18 and in general the peripheral side surface 16 of the cutting insert may have N identical major sides, wherein N is an integer greater than 2, and the cutting insert has θ° rotational symmetry about the insert axis A, where θ=360°/N. In the specific embodiments described herein and illustrated in the drawings, N=4 and the cutting insert 10 has 90° rotational symmetry about the insert axis A.

A cutting edge 20, formed at the intersection of a relief surface 22 and a rake surface 24, is associated with each major side 18. Each cutting edge 20 comprises a corner cutting edge 26 extending between a major cutting edge 28 and an auxiliary cutting edge 30. Each major cutting edge 28 may be adapted to mill a shoulder in a workpiece and at least a section of the adjacent auxiliary cutting edge 30 may act as a wiper to provide a good surface finish. Each relief surface 22 comprises a corner relief surface 32 extending between a major relief surface 34 and an auxiliary relief surface 36. Each rake surface 24 is located in an associated major side 18 and comprises a corner rake surface 38 extending between a major rake surface 40 and an auxiliary rake surface 42. The corner, major and auxiliary cutting edges 26, 28, 30 are formed at the intersection of respective corner, major and auxiliary relief surfaces 32, 34, 36 with respective corner, major and auxiliary rake surfaces 38, 40, 42. Since each major side 18 is located between, and merges with, an adjacent major side 18, and further since each major side 18 has an associated major cutting edge 28 on the same side of the cutting insert, the cutting insert 10, though single-sided, is considered to be "fully indexable". This contrasts with indexable cutting inserts having major sides that are not between and do not merge with, adjacent major sides, such as cutting inserts whose major side surfaces are separated from one another by minor side surfaces.

In accordance with some embodiments, at least a section of each auxiliary cutting edge 30 adjacent an associated corner cutting edge 32 extends from the associated corner cutting edge 32 in a direction towards a plane P defined by the bottom surface 14. In this context, the term "defined by" refers to the plane P on which the cutting insert rests when in the upright position as seen in, e.g., FIG. 5. In accordance with some embodiments, as seen for example in FIG. 5, each auxiliary cutting edge 30 extends from an associated corner cutting edge 26 in a direction towards the plane P.

Each major relief surface 34 is located in the top surface 12. Therefore, at least a portion of the relief surface 22 is located in the top surface 12. Each auxiliary relief surface 36 may be located in an adjacent major side 18.

Each rake surface 24 may extend in an inward direction of the cutting insert 10 from an associated cutting edge 20 to a side surface 44 of an associated major side 18. During a metal cutting operation, chips cut from a workpiece by the part of the cutting edge 20 that is in contact with the workpiece, flow along the rake surface 24 towards the side surface 44. In some applications, depending on the general cutting conditions, that is, the working conditions and the type of metal the workpiece is made of, the chips may continue to flow from the rake surface 24 along at least part of the side surface 44. How far along the side surface 44 the chips may flow is dependent on the general cutting condition. Consequently, a portion of, or the whole of, the side surface 44 may also form a surface that may be referred to as a rake surface.

The cutting insert 10 is a single-sided insert. Each major side 18 meets the bottom surface 14 at a bottom edge 46. The bottom edges 46 generally are not used as cutting edges. Hence, the bottom surface 14 is different from the top surface 12. The cutting insert 10 may include an insert through bore 48 extending along the insert axis A and opening out to the top and bottom surfaces 12, 14.

Figure 6:
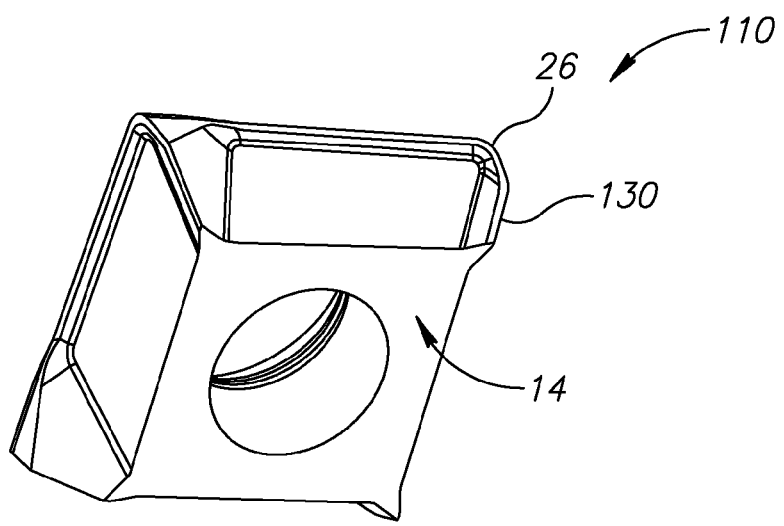
FIG. 6 is a bottom perspective view of a cutting insert in accordance with a second embodiment of the present invention.
Figure 7:
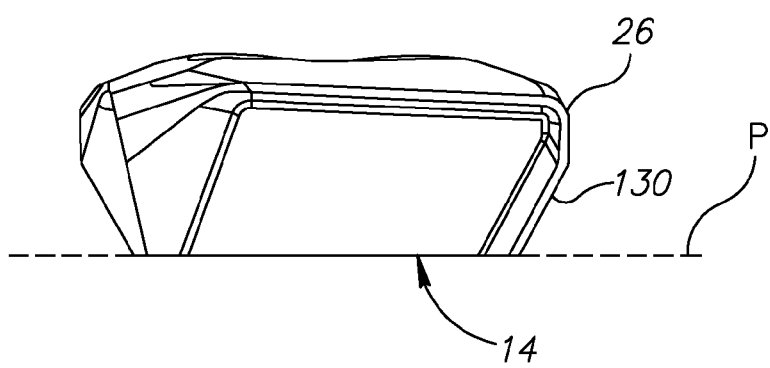
FIG. 7 is a side view of the cutting insert shown in FIG. 6.

Reference is now drawn to FIGS. 6 and 7, showing a cutting insert 110 in accordance with a second embodiment of the present invention. The same parts in the first and second embodiments are indicated by the same reference numerals. The cutting insert 110 in accordance with the second embodiment is similar to the cutting insert 10 in accordance with the first embodiment. The main difference being that in the cutting insert 110 in accordance with the second embodiment, each auxiliary cutting edge 130 extends from an associated corner cutting edge 26 to the plane P defined by the bottom surface 14 of the cutting insert 110. That is, the auxiliary cutting edges 130 in accordance with the second embodiment are longer than the auxiliary cutting edges 30 in accordance with the first embodiment. As in the first embodiment, at least a section of the auxiliary cutting edges 130 of the cutting insert in accordance with the second embodiment may be used as a wiper in face milling and shoulder milling. A section of each of the auxiliary cutting edges 130 may also function as an operative cutting edge in ramp down operations. The longer auxiliary cutting edges 130 of the second embodiment may provide more versatility such cutting operations.

Figure 8:
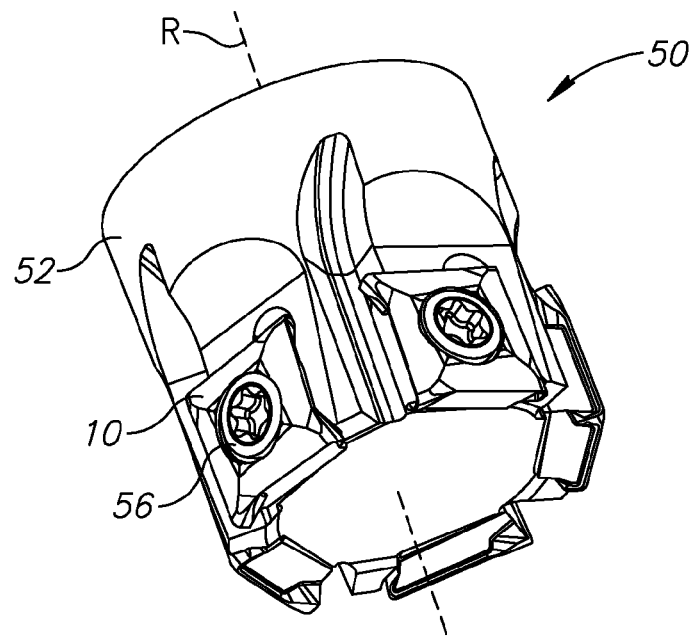
FIG. 8 is a perspective view of a cutting tool in accordance with embodiments of the present invention.

Attention is now drawn to FIG. 8 showing a milling tool 50 with an axis of rotation R, having a tool body 52 provided with a plurality of insert pockets 54. In each insert pocket 54 a cutting insert 10 in accordance with the present invention is clamped by means of a clamping screw 56. Although the cutting inserts 10 shown in FIG. 8 are in accordance with the first embodiment, cutting inserts 110 in accordance with the second embodiment may also be used. The cutting inserts 10 are tangential cutting inserts. They are mounted tangentially in the cutting tool in such a manner that during a cutting operation on a workpiece the cutting forces are directed along a major (thicker) dimension D of the cutting insert. An advantage of such an arrangement is that the cutting insert can withstand greater cutting forces than when oriented in such a manner that the cutting forces are directed along a minor (thinner) dimension d of the cutting insert (see FIGS. 4 and 5 for the definitions of the dimensions D and d).

Figure 9:
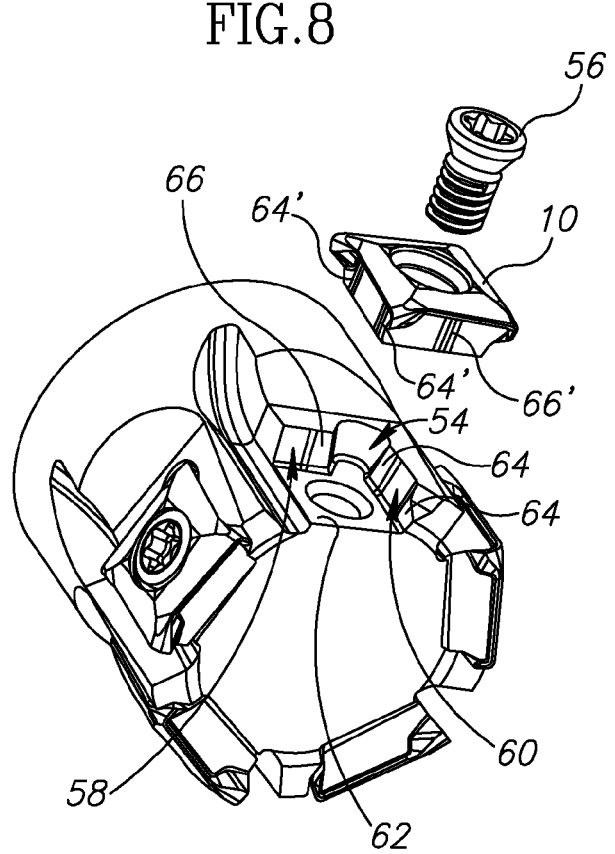
FIG. 9 shows the cutting tool of FIG. 8 with a cutting insert removed from an insert pocket.

Attention is now drawn to FIG. 9 showing the milling tool of FIG. 8 with a cutting insert removed from one of the insert pockets 54, so that the structure of the insert pocket 54 can be seen. The insert pocket 54 comprises adjacent side and rear walls 58, 60 generally transverse to a base 62. The rear wall 60 is provided with two spaced apart protruding tangential location surfaces 64 for abutting two corresponding spaced apart tangential abutment regions 64' on a given side surface 44 of the cutting insert 10. The side wall 58 is provided with an axial location surface 66 for abutting a corresponding axial abutment region 66' located in a side surface 44 adjacent the given side surface 44. The cutting insert 10 shown removed from an insert pocket in FIG. 9 has been rotated through 180° so that the operative spaced apart tangential abutment regions 64' and axial abutment region 66' can be seen. While the insert 10 in FIG. 9 is drawn with vertical lines to indicate the locations of the spaced apart tangential abutment regions 64' and the axial abutment region 66', it is understood that these vertical lines appear in FIG. 9 solely to indicate regions 64' and 66', and that no such lines may appear on the actual insert, whose insert major sides 18 are generally identical to one another.

In accordance with some embodiments, the side surfaces 44 may be planar. In such embodiments, the tangential and axial abutment regions 64', 66' and the two spaced apart tangential abutment regions 64' are flat and coplanar. Such an arrangement is particularly straightforward to manufacture.

Figure 4:
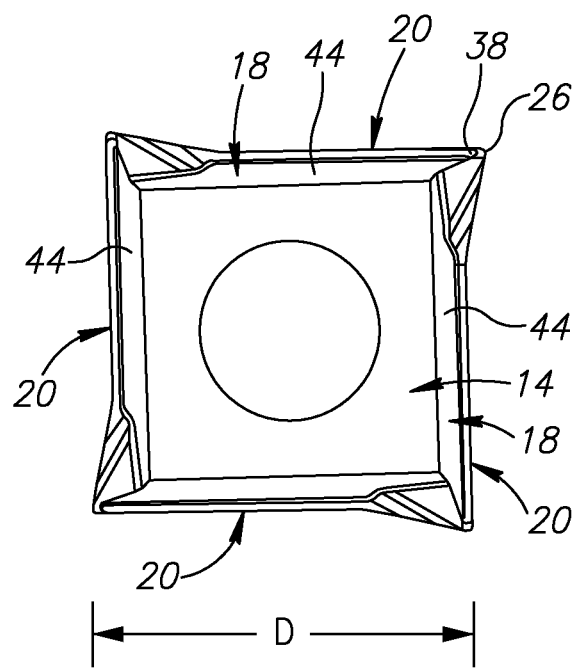
FIG. 4 is a bottom view of the cutting insert shown in FIG. 1.
Figure 5:
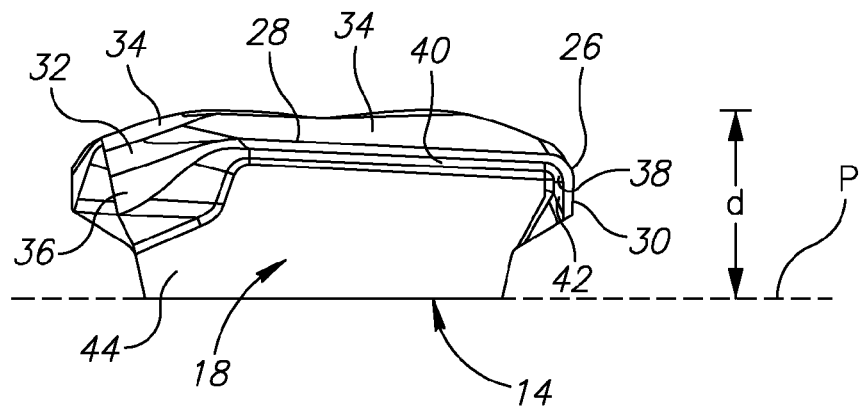
FIG. 5 is a side view of the cutting insert shown in FIG. 1.

In accordance with some embodiments, the side surfaces 44 may be planar and may diverge outwardly from the bottom surface 14 towards the top surface 12 (see, for example, FIGS. 4 and 5).

As can be seen, for example, in FIG. 4, in a top view of the cutting insert 10, the cutting edges 20 protrude outwardly from the cutting insert 10 relative to their associated side surfaces 44. Hence, the present invention provides a single-sided indexable tangential cutting insert 10, 110 having three or more adjacent identical major sides 18.

Since the cutting insert 10, 110 is single-sided and has no undercuts, it may be straightforwardly pressed by a non-split, single-axis die. Thus, the cutting insert 10, 110 can formed by first providing a non-split, single-axis die, uni-axially form-pressing carbide powders using the non-split, single-axis die to form an insert green body of suitable shape, and then sintering the green body to arrive at an insert blank, which may then be subjected to post-sintering operations, such as grinding and/or coating, among others. Persons having ordinary skill in the art are familiar with such operations. In contrast to the single-sided tangential cutting insert of the present invention, a double sided indexable tangential cutting insert having three or more adjacent identical major sides provides twice the number of cutting edges, but does not lend itself to straightforward pressing. Straightforward pressing does not require using, for example, complex dies, such as split dies.

Although the present invention has been described to a certain degree of particularity, it should be understood that various alterations and modifications could be made without departing from the scope of the invention as hereinafter claimed.

What is claimed is:

1. A fully indexable, single-sided cutting insert (10, 110) comprising:
    a top surface (12), an opposing bottom surface (14) different from the top surface (22) and a peripheral side surface (16) extending between the top and bottom surfaces (12, 14), the peripheral side surface (16) having N identical major sides (18), wherein N is an integer greater than 2 and each major side (18) is located between and merges with an adjacent major side (18);
    a cutting edge (20) associated with each major side (18), the cutting edge (20) comprising a major cutting edge (28) formed at the intersection of each major side (18) and the top surface (12), an auxiliary cutting edge (30), and a corner cutting edge (26) extending between the major and auxiliary cutting edge (28, 30); wherein:
    at least a section of the auxiliary cutting edge (30) adjacent the corner cutting edge (26) extends from the corner cutting edge (26) in a direction towards a plane (P) defined by the bottom surface (14);
    each cutting edge (20) is formed at the intersection of a relief surface (22) and a rake surface (24), the rake surface (24) extending in an inward direction of the cutting insert (10) from its associated cutting edge (20) to a side surface (44) of an associated major side (18), the side surface having at least one abutment region (64', 66'), the rake surface (24) comprises major and auxiliary rake surfaces (40, 42) with a corner rake surface (38) extending therebetween and the major rake surface (40) being spaced apart from the bottom surface (14) by the side surface (44), and the relief surface (22) comprises major and auxiliary relief surfaces (34, 36) with a corner relief surface (32) extending therebetween;
    the corner, major and auxiliary cutting edges (26, 28, 30) are formed at the intersection of respective corner, major and auxiliary relief surfaces (32, 34, 36) with respective corner, major and auxiliary rake surfaces (38, 40, 42); and
    the cutting insert (10) has θ° rotational symmetry about an insert axis (A) passing through the top and bottom surfaces (12, 14), where θ=360°/N.

2. The cutting insert (10, 110) according to claim 1, comprising an insert through bore (48) extending along the insert axis (A) and opening out to the top and bottom surfaces (12, 14).

3. The cutting insert (110) according to claim 1, wherein each auxiliary cutting edge (30) extends from an associated corner cutting edge (26) to the plane (P).

4. The cutting insert (10, 110) according to claim 1, wherein each major relief surface (34) is located in the top surface (12).

5. The cutting insert (10, 110) according to claim 1, wherein each auxiliary relief surface (36) is located in an adjacent major side (18).

6. The cutting insert (10, 110) according to claim 1, wherein the side surfaces (44) are planar.

7. The cutting insert (10, 110) according to claim 6, wherein the side surfaces (44) diverge outwardly from the bottom surface (14) towards the top surface (12).

8. The cutting insert (10, 110) according to claim 1, wherein N=4 and θ=90°.

9. The cutting insert according to claim 1, made by:
    providing a non-split, single-axis die;
    uni-axially form-pressing carbide powders using the non-split single-axis die to form an insert green body of suitable shape; and
    sintering the insert green body.

10. A milling tool comprising a tool body (52) having at least one insert pocket (54) in which a cutting insert is retained, wherein the cutting insert comprises the cutting insert (10, 110) of claim 1.

11. The milling tool according to claim 10, wherein:
    each side surface (44) of the cutting insert comprises two spaced apart tangential abutment regions (64') and an axial abutment region (66');
    the at least one insert pocket (54) comprises adjacent side and rear walls (58, 60) generally transverse to a base (62), the rear wall (60) being provided with two spaced apart protruding tangential location surfaces (64), and the side wall (58) being provided with an axial location surface (66);
    the two spaced apart protruding tangential location surfaces (64) of the insert pocket abut the two spaced apart tangential abutment regions (64') on a first side surface (44) of the cutting insert; and
    the axial location surface (66) of the insert pocket abuts the axial abutment region (64') on an adjacent second side surface (44) of the cutting insert.

12. A milling tool comprising a tool body (52) having at least one insert pocket (54) in which a cutting insert is retained, wherein:
    the at least one insert pocket (54) comprises adjacent side and rear walls (58, 60) generally transverse to a base (62), the rear wall (60) being provided with two spaced apart protruding tangential location surfaces (64), and the side wall (58) being provided with an axial location surface (66);

the cutting insert comprises:
- a top surface (12), an opposing bottom surface (14) different from the top surface (22) and a peripheral side surface (16) extending between the top and bottom surfaces (12, 14), the peripheral side surface (16) having N identical major sides (18), wherein N is an integer greater than 2 and each major side (18) is located between and merges with an adjacent major side (18);
- a cutting edge (20) associated with each major side (18), the cutting edge (20) comprising a major cutting edge (28) formed at the intersection of each major side (18) and the top surface (12), an auxiliary cutting edge (30), and a corner cutting edge (26) extending between the major and auxiliary cutting edge (28, 30); wherein:
- at least a section of the auxiliary cutting edge (30) adjacent the corner cutting edge (26) extends from the corner cutting edge (26) in a direction towards a plane (P) defined by the bottom surface (14);
- each cutting edge (20) is formed at the intersection of a relief surface (22) and a rake surface (24), the rake surface (24) extending in an inward direction of the cutting insert (10) from its associated cutting edge (20) to a side surface (44) of an associated major side (18), the rake surface (24) comprises major and auxiliary rake surfaces (40, 42) with a corner rake surface (38) extending therebetween and the relief surface (22) comprises major and auxiliary relief surfaces (34, 36) with a corner relief surface (32) extending therebetween;

each side surface (44) comprises two spaced apart tangential abutment regions (64') and an axial abutment region (66');
- the corner, major and auxiliary cutting edges (26, 28, 30) are formed at the intersection of respective corner, major and auxiliary relief surfaces (32, 34, 36) with respective corner, major and auxiliary rake surfaces (38, 40, 42); and
- the cutting insert (10) has θ° rotational symmetry about an insert axis (A) passing through the top and bottom surfaces (12, 14), where θ=360°/N;

the two spaced apart protruding tangential location surfaces (64) of the insert pocket abut the two spaced apart tangential abutment regions (64') on a first side surface (44) of the cutting insert; and the axial location surface (66) of the insert pocket abuts the axial abutment region (64') on an adjacent second side surface (44) of the cutting insert.

13. The cutting insert according to claim 1, wherein each side surface (44) comprises two spaced apart tangential abutment regions (64') and an axial abutment region (66').

14. A fully indexable, single-sided cutting insert (10, 110) comprising:
- a top surface (12), an opposing bottom surface (14) different from the top surface (22) and a peripheral side surface (16) extending between the top and bottom surfaces (12, 14), the peripheral side surface (16) having N identical major sides (18), wherein N is an integer greater than 2 and each major side (18) is located between and merges with an adjacent major side (18);
- a cutting edge (20) associated with each major side (18), the cutting edge (20) comprising a major cutting edge (28) formed at the intersection of each major side (18) and the top surface (12), an auxiliary cutting edge (30), and a corner cutting edge (26) extending between the major and auxiliary cutting edge (28, 30); wherein:
- at least a section of the auxiliary cutting edge (30) adjacent the corner cutting edge (26) extends from the corner cutting edge (26) in a direction towards a plane (P) defined by the bottom surface (14);
- each cutting edge (20) is formed at the intersection of a relief surface (22) and a rake surface (24), the rake surface (24) extending in an inward direction of the cutting insert (10) from its associated cutting edge (20) to a side surface (44) of an associated major side (18), the rake surface (24) comprises major and auxiliary rake surfaces (40, 42) with a corner rake surface (38) extending therebetween and the relief surface (22) comprises major and auxiliary relief surfaces (34, 36) with a corner relief surface (32) extending therebetween;
- the corner, major and auxiliary cutting edges (26, 28, 30) are formed at the intersection of respective corner, major and auxiliary relief surfaces (32, 34, 36) with respective corner, major and auxiliary rake surfaces (38, 40, 42);
- the cutting insert (10) has θ° rotational symmetry about an insert axis (A) passing through the top and bottom surfaces (12, 14), where θ=360°/N; and
- each side surface (44) comprises two spaced apart tangential abutment regions (64') and an axial abutment region (66').

* * * * *